United States Patent [19]

Link

[11] 4,048,880
[45] Sept. 20, 1977

[54] SYSTEM FOR SUPPLYING HYDRAULIC FLUID TO AGGREGATES ON SPINDLES OR THE LIKE

[75] Inventor: Helmut Link, Schanbach, Germany

[73] Assignee: Index-Werke KG Hahn & Tessky, Esslingen, Germany

[21] Appl. No.: 656,584

[22] Filed: Feb. 9, 1976

Related U.S. Application Data

[62] Division of Ser. No. 385,479, Aug. 3, 1973, abandoned.

[30] Foreign Application Priority Data

Aug. 8, 1972 Germany .............................. 2238986

[51] Int. Cl.$^2$ ......................... B23B 19/02; B23B 3/34
[52] U.S. Cl. .......................................... 82/29 R; 82/3
[58] Field of Search ................................. 82/29, 30, 3

[56] References Cited

U.S. PATENT DOCUMENTS

| 3,365,990 | 1/1968 | Jacoby | 82/29 |
| 3,744,354 | 7/1973 | Gilbert | 82/3 R |

FOREIGN PATENT DOCUMENTS

| 1,248,430 | 8/1967 | Germany | 82/30 |

Primary Examiner—Harrison L. Hinson
Attorney, Agent, or Firm—Michael J. Striker

[57] ABSTRACT

A multiple-spindle machine tool or a multi-speed transmission wherein the spindles or shafts carry several fluid-operated aggregates in the form of clutches, brakes and/or work clamping devices which receive pressurized fluid by way of axially movable spools mounted in or surrounding the respective spindles or shafts. The spools are movable axially by a stationary cam (in a machine tool) or by an indexible cam (in a transmission), and receive pressurized fluid which is admitted axially or radially, depending upon whether the spools are received in or surround the respective spindles or shafts.

17 Claims, 22 Drawing Figures

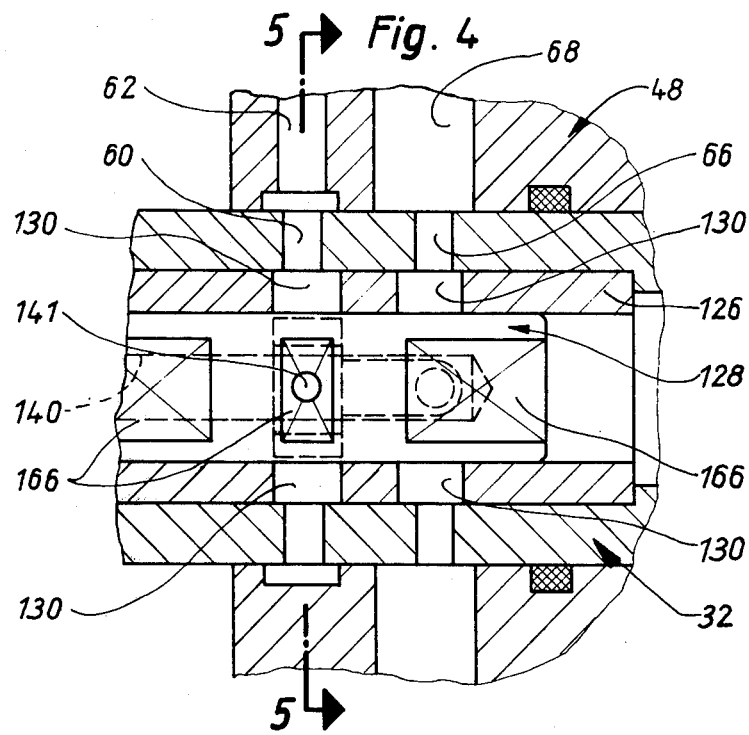
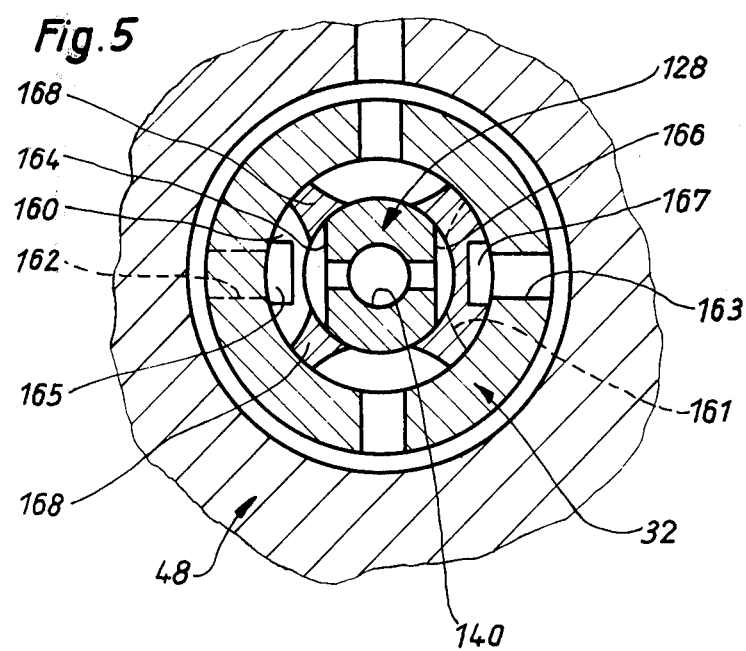

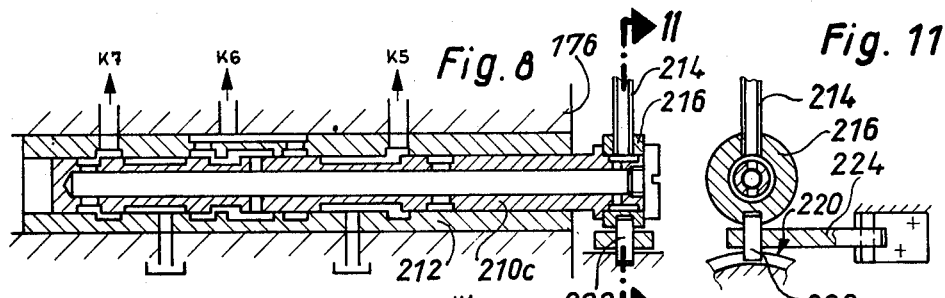
Fig. 8    Fig. 11
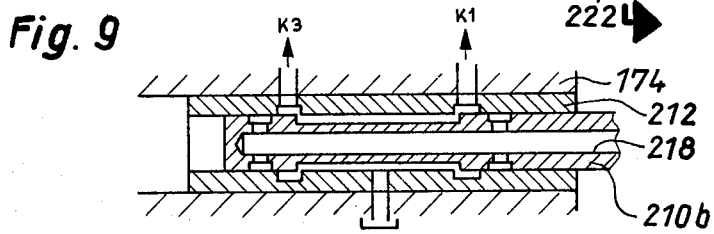
Fig. 9
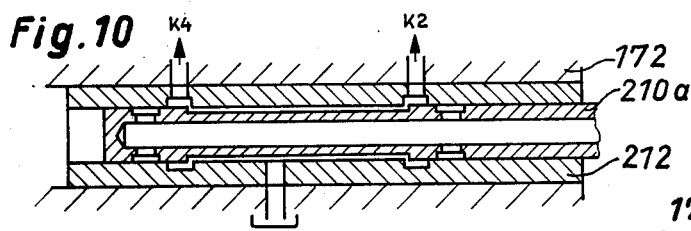
Fig. 10
Fig. 12
Fig. 13
| | | | |
|---|---|---|---|
| n8 | 2000 | K4, | K5 |
| n7 | 1600 | K4, | K6 |
| n6 | 1250 | K3 | K5 |
| n5 | 1000 | K3 | K6 |
| n4 | 800 | K2 | K5 |
| n3 | 630 | K2 | K6 |
| n2 | 500 | K1 | K5 |
| n1 | 400 | K1 | K6 |
| n0 | − | K6 | K7 |
| n-1 | 100 | K1 | K7 |
| n-2 | 160 | K2 | K7 |
| n-3 | 250 | K3 | K7 |
| n-4 | 400 | K4 | K7 |
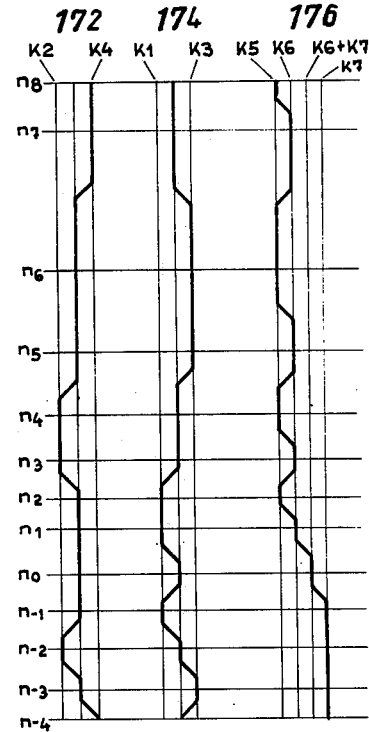

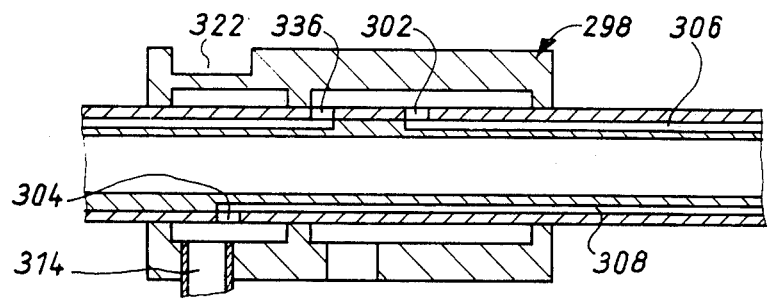
Fig. 18
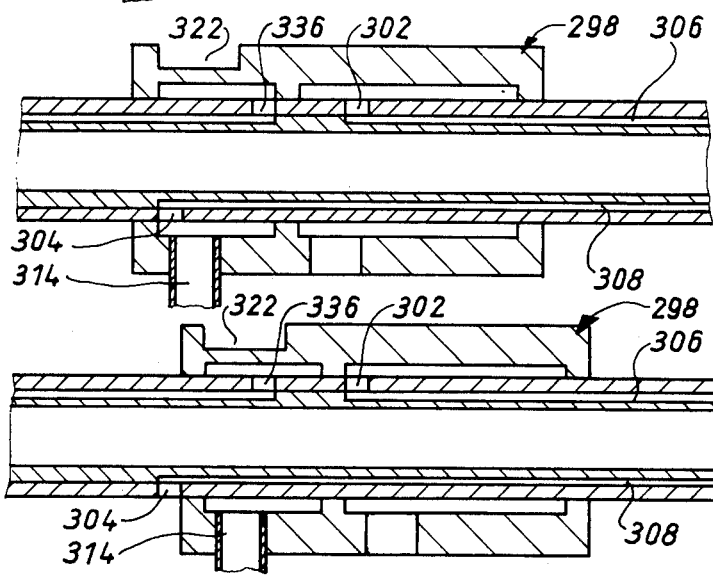
Fig. 19
Fig. 20
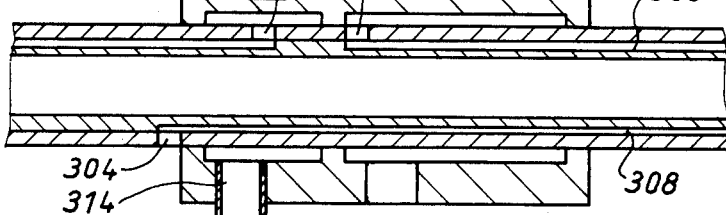
Fig. 21
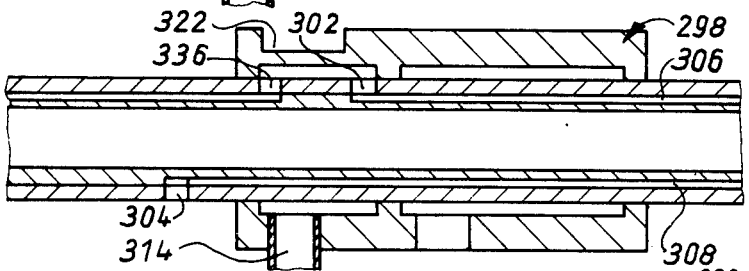
Fig. 22
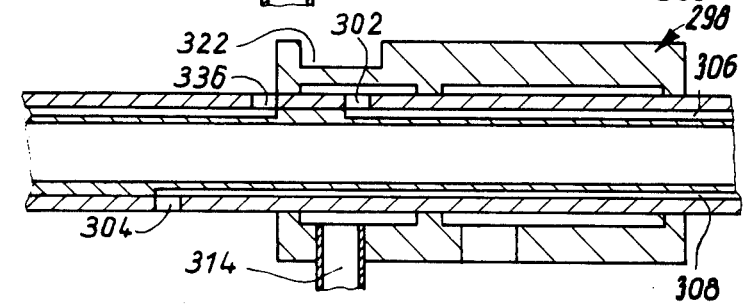

SYSTEM FOR SUPPLYING HYDRAULIC FLUID TO AGGREGATES ON SPINDLES OR THE LIKE

This is a division of application Ser. No. 385,479, filed Aug. 3, 1973, now abandoned.

BACKGROUND OF THE INVENTION

The present invention relates to improvements in machines and/or apparatus wherein one or more rotary members are installed in stationary or mobile supports and carry one, two or more fluid-operated aggregates in the form of couplings, clutches, brakes, clamping devices or the like which receive a pressurized control fluid (e.g., oil) by way of a distributor valve system including axially movable valve members in the form of spc having axially spaced plungers or lands. Examples of machines which employ a plurality of rotary members in the form of work supporting spindles are multiple-spindle automatic machine tools wherein the spindles are rotatable in a rotary drum-shaped carrier which is indexible between a plurality of positions to thereby move the front ends of successive spindles into optimum positions with respect to material tools at a plurality of working stations. As a rule, each spindle is mounted in at least two antifriction bearings of the spindle carrier and each spindle can carry three or more aggregates including a brake which can rapidly arrest the respective spindle, a clamping device which can engage a workpiece at the front end of the respective spindle, and one or more clutches which can couple the respective spindle to gears or analagous torque transmitting elements to thereby rotate the spindle at a selected speed.

Each aggregate may comprise a single-acting or a double-acting cylinder whose chamber or chambers receive pressurized control fluid or discharge control fluid in selected axial positions of the associated valve member. Third-operated (especially hydraulically operated) aggregates are becoming increasingly popular in control systems of machine tools, multi-speed transmissions or the like because their development has reached a highly advanced stage so that a fluid-operated clutch or brake is normally preferred over a mechanically or electrically operated clutch or brake. As a rule, a fluid-operated clutch or brake can transmit or take up a torque exceeding up to four times that torque which is transmitted or taken up by an equally small or even larger electrically or mechanically operated clutch or brake. Moreover, a fluid-operated brake or clutch can stand substantially greater thermal stresses than a mechanically or electrically operated brake or clutch.

A serious problem which remains to be solved in machines employing spindles, shafts or analogous rotary members supporting one or more fluid-operated aggregates which receive pressurized control fluid by way of a distributor valve is that of supplying the control fluid to selected aggregates in a space- and material-saving manner. The situation is aggravated in multiple-spindle machine tools of the type known as bar machines wherein elongated bar stock is fed lengthwise through the axial passages of hollow work supporting spindles, and also in turning machines wherein a shaft in a multi-speed transmission or a work supporting spindle must carry a large number of brakes and/or clutches. In presently known machines, the fluid-operated aggregates on the rotary members receive control fluid which flows radially inwardly into the chamber or chambers of stationary single-acting or double-acting cylinders of the respective aggregates. Such proposal has met with little success due to generation of excessive heat, especially when the rotary member or members are driven at are driven at a high speed. Moreover, discrete groups of fluid supplying and evacuating conduits must be provided for each aggregate, and the flow of fluid in each group of conduits must be regulated by a discrete control valve which necessitates complex and expensive actuating means for moving the valve member relative to the valve body.

SUMMARY OF THE INVENTION

An object of the invention is to provide in a machine tool, in a multi-speed transmission or in an analogous machine or apparatus wherein one or more rotary members carry fluid-operated aggregates a novel and improved system for supplying a control fluid to selected aggregates without excessive generation of heat and by resorting to relatively simple, compact, rugged and inexpensive parts.

Another object of the invention is to provide a fluid supplying system which can feed oil or another hydraulic control fluid to a large number of aggregates without resorting to complex, bulky and expensive conduits and with a minimal number of valves.

A further object of the invention is to provide a fluid supplying system which affords access to the aggregates on rotary members and which reduces the bulk, hence the space requirements of the machine or apparatus wherein the rotary member or members are used because the control fluid need not be supplied radially of and toward the rotary members.

The invention is embodied in a machine tool, in a multi-speed transmission or in another machine or apparatus of the above outlined character which comprises support means (e.g., the stationary case of a gear transmission or the indexible carrier for work spindles in multiple-spindle chucking or bar machines, at least one rotary member (such as a shaft or a spindle) mounted in the support means, preferably in at least two spaced apart antifriction bearings, a plurality of fluid-operated aggregates mounted on the rotary member (such aggregates may include one, two or more clutches, one or more work clamping devices), a source of pressurized control fluid, and a novel and improved control system for connecting the aggregates with the source and/or for permitting selected aggregates to discharge control fluid.

The control system comprises a valve member (e.g., a spool with several plungers or lands) which surrounds the rotary member or vice versa and is movable axially of the rotary member between a plurality of positions in each of which a different group of aggregates is connected with the source and/or is free to discharge control fluid, and actuating means (e.g., stationary or movable cam means) for moving the valve member between its axial positions.

The novel features which are considered as characteristic of the invention are set forth in particular in the appended claims. The improved fluid supplying control system itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 4 illustrates the structure of FIG. 2 but with the valve member in the work spindle turned through 90°;

FIG. 5 is a sectional view as seen in the direction of arrows from the line 5—5 of FIG. 4.

FIG. 8 is a fragmentary axial sectional view of the output shaft in the transmission of FIG. 6;

FIG. 9 is a similar fragmentary axial sectional view of an intermediate shaft in the transmission of FIG. 6;

FIG. 10 is a similar fragmentary axial sectional view of the input shaft in the transmission of FIG. 6;

FIG. 11 is a sectional view as seen in the direction of arrows from the line 11—11 of FIG. 8;

FIG. 12 is a developed view of the periphery of an actuating cam for the valve members in the shafts shown in FIGS. 8 to 10;

FIG. 13 is a chart showing various combinations of fluid-operated aggregates which must be engaged in order to drive the output shaft of the transmission at selected speeds in forward and reverse as well as to hold the output shaft against rotation;

FIG. 18 is an enlarged view of a detail in FIG. 17, showing the valve member on the work spindle of FIG. 17 in a first axial position;

FIG. 19 is a similar view but showing the valve member in a second position;

FIG. 20 is a similar view but showing the valve member in a third position;

FIG. 21 is a similar view but showing the valve member in a fourth position; and FIG. 22 is a similar view but showing the valve member is still another position.

DESCRIPTION OF THE PREFERRED EMBODIMENTS

Figure 1:
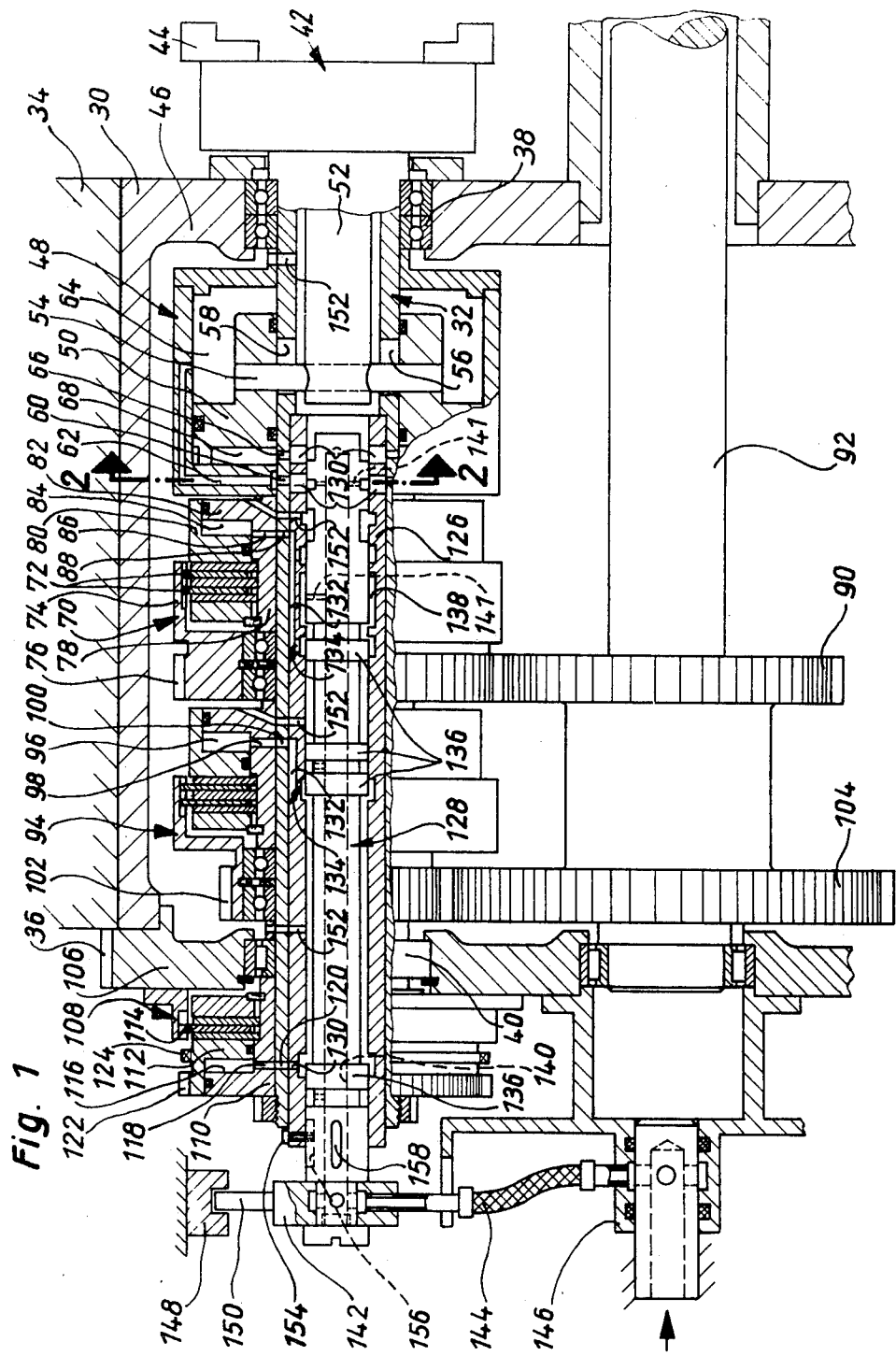
FIG. 1 is a fragmentary axial sectional view of the spindle carrier in a multiple-spindle chucking automatic wherein each work spindle carries several fluid-operated aggregates which receive pressurized hydraulic control fluid through the intermediary of a control system which embodies one form of the invention.
Figure 2:
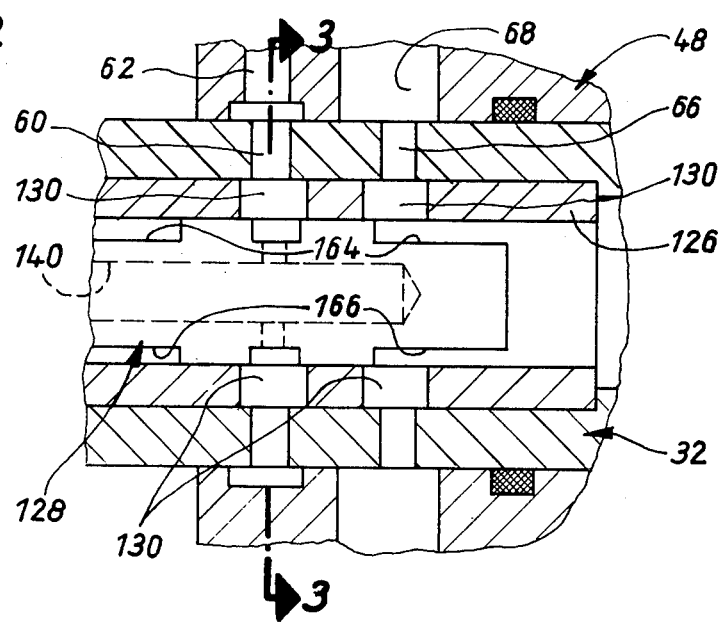
FIG. 2 is an enlarged view of a detail in the structure of FIG. 1.

Referring first to FIG. 1, there is shown a portion of a multiple-spindle automatic chucking machine having a rotary drum-shaped spindle carrier 30 which is indexible in a housing or frame 34 and serves as a support for rotary members in the form of several work supporting spindles 32 (only one shown). The rear(left-hand) end portion of the spindle carrier 30 is connected to or is integral with a ring gear 36 forming part of a mechanism for indexing the spindle carrier through predetermined angles so that successive spindles 32 reach successive working stations where the workpieces or blanks carried by the work clamping devices 42 of the spindles are treated by material removing tools, not shown.

The illustrated spindle 32 is mounted in two axially spaced antifriction bearings 38, 40 of the carrier 30. The bearing 38 includes two ball bearings and the bearing 40 includes a pair of races with roller-shaped rolling elements therebetween. The work clamping device 42 is a chuck which is mounted at the front end of the spindle 32 and has several equidistant work engaging elements in the form of jaws 44 which are movable radially inwardly to engage a workpiece and radially outwardly to permit removal of a finished article, or vice-versa. The clamping device 42 constitutes a first automatic fluid-operated aggregate which is mounted on the spindle 32 and is arranged to receive pressurized hydraulic control fluid as well as to discharge fluid by way of a control system which embodies one form of the present invention. The fluid-operated part or motor of the clamping device 43 is shown at 48; it is located immediately or closely behind the front end wall 46 of the spindle carrier 30. The part 48 is a double-acting cylinder whose cylinder body 48a surrounds a reciprocable displacing piston 50 which is slidable with minimal clearance along the peripheral surface of the spindle 32. As shown in FIG. 1, the internal surface of the piston 50 is provided with grooves for 0-rings or analogous sealing elements which prevent uncontrolled flow of fluid between the cylinder chambers 64, 68 at the opposite axial ends of the piston 50.

The spindle 32 is hollow and its front end portion receives a reciprocable rod 52 which is operatively connected with the jaws 44 in a manner not forming part of the invention. The arrangement is such that the jaws 44 move radially inwardly when the rod 52 is moved in one direction, and that the jaws 44 move radially outwardly when the rod 52 is moved in the other direction. The means for connecting the rod 52 for axial movement with the piston 50 in the cylinder body 48a comprises a pin 54 whose axis is normal to the axis of the spindle 32 and which is reciprocable in axially parallel slots 56, 58 of the spindle. The slots 56, 58 are located diametrically opposite each other with reference to the common axis of the spindle 32 and piston 50.

The spindle 32 is further provided with two radially extending openings or channels 60 and 66 the latter of which is in permanent communication with the cylinder chamber 68 at the left-hand axial end of the piston 50, as viewed in FIG. 1. The channel 60 communicates with the cylinder chamber 64 by way of one or more auxiliary or connecting channels machined into the cylinder body 48a. The piston 50 moves in a direction to the right when the chamber 68 receives pressurized hydraulic fluid by way of the channel 66 while the chamber 64 discharges fluid by way of the channel 60 and vice versa.

A second fluid-operated aggregate 70 on the spindle 32 constitutes a clutch having a set of laminae or disks 72 mounted for axial movement in a cylindrical holder 74. The disks 72 cannot rotate relative to the holder 74 which latter is provided with an annulus of external teeth forming a gear 76. The holder 74 constitutes one half of the aggregate or clutch 70 the other half of which includes a ring-shaped piston 80 movable axially on a sleeve 78 which surrounds the peripheral surface of the spindle 32. The piston 80 has a cylindrical portion which surrounds a flange 82 of the sleeve 78 and defines therewith a cylinder chamber 84 communicating with a radical channel or opening 86 of the sleeve 78. The channel 86 communicates with a radially extending opening or channel 88 of the spindle 32.

The gear 76 of the holder 74 for the disks 72 meshes with a driver gear 90 secured to a main drive shaft 92 which is coaxial with and is rotatable relative to the spindle carrier 30. When the shaft 92 drives the holder 74 through the intermediary of the gears 90, 76, the spindle 32 rotates about its axis as long as the chamber 84 is filled with pressurized fluid. Such fluid causes the piston 80 to press the disks 72 against each other and to urge the leftmost disk 72 against a disk-shaped back support 82a which is fixed to the spindle 32 by way of the sleeve 78. When the pressure of fluid in the chamber 80 decreases, the holder 74 can rotate relative to the sleeve 78 and spindle 32. The holder 74 is rotatably mounted on two antifriction bearings 74a which surround the spindle 32.

A third aggregate 94 which also constitutes a fluid-operated clutch is mounted on the spindle 32 behind the clutch 70 and serves to rotate, when necessary, the spindle 32 in response to rotation of the main drive shaft 92 but at a speed which differs from (in the present instance exceeds) the speed of the spindle when the latter receives torque from the clutch 70. The construction of the clutch 94 is identical with or similar to that of the clutch 70. The cylinder chamber is shown at 96, the radial channel of the sleeve at 98 and the radial opening or channel of the spindle 32 at 100. The holder of the clutch 94 is provided with a gear 102 which meshes with a second driver gear 104 on the main shaft 92. The gears 90, 104 are preferably integral with each other, i.e., they may constitute a cluster which receives torque from the main drive shaft 92.

The rear end portion of the spindle 32 extends through and beyond a rear end wall 106 of the carrier 30 and supports a fourth fluid-operated aggregate 108 which constitutes a brake. This brake comprises a sleeve 110 which is rigid with the rear end portion of the spindle 32 and is surrounded by a reciprocable ring-shaped piston 112 which can be moved axially relative to a brake disk 114.

The sleeve 110 defines with the piston 112 a cylinder chamber 116 which communicates with a radially extending channel 118 of the sleeve 110 and with a radially extending opening or channel 120 of the spindle 32. The piston 112 cannot rotate on the sleeve 110 and is provided with an annulus of external teeth constituting a gear 122. Still further, the piston 112 is provided with a set of external projections or detent elements 124 which can cooperate with complementary detent elements (not shown) to arrest the spindle 32 in a predetermined angular position. Also, the complementary detent element may serve to index the spindle 32 to a predetermined angular position relative to the carrier 30. As a rule, the gear 122 will be used to change the angular position of the spindle 32; to this end, the gear 122 meshes with a driver gear (not shown) which can be rotated automatically or by hand to thereby rotate the spindle 32 in the carrier 30.

The brake disk 114 is axially movably but non-rotatably secured to a ring-shaped holder 114a which is affixed to the rear end wall 106 of the carrier 30. When the cylinder chamber 116 receives pressurized fluid, the piston 112 biases the disk 114 against an annular back support 110a which is affixed to the sleeve 110 so that when the brake 108 is engaged, a non-rotating part (disk 114) is engaged by two rotating parts (112, 110a) which brings the spindle 32 (rotating with the parts 112, 110a) to a rapid stop.

The improved control system which regulates the flow of fluid to and from the aggregates 42, 70, 94 and 108 is installed in the work spindle 32. The control system comprises a sleeve-like tubular guide member 126 which is mounted in and shares all movements of the spindle 32, and a valve member or spool 128 which is axially movably installed in the guide member 126. The spool 128 normally shares all angular movements of the spindle 32 and guide member 126; however, it can be moved between and fixed in a plurality of different angular positions to thus enable the spindle 32 to carry a work clamping device wherein the work engaging elements (see the jaws 44) must move radially inwardly for engagement with the exterior of a workpiece or radially outwardly for engagement with the internal surface of a workpiece.

The radial openings 60, 66, 88, 100, 120 of the spindle 32 communicate with openings or channels machined into the guide member 126. The openings or channels of the guide member 126 include radially extending bores 130, axially parallel grooves 132 machined into the peripheral surface of the guide member 126, and radial bores 134 which connect the grooves 132 with the interior of the guide member 126. The guide member 126 is a tight fit in the spindle 32 so that fluid which enters a groove 132 can leave such groove only by way of the respective radial opening in the spindle 32 or by way of the respective radial bore 134 in the guide member 126.

The spool 128 comprises a plurality of spaced apart plungers or lands 136 having annular fluid flow regulating shoulders. The internal surface of the guide member 126 is provided with a number of annular recesses 138 and this guide member defines with the spool 128 a number of annular compartments which can admit fluid to or receive fluid from the adjacent aggregates by way of the corresponding radial openings 130, 134 of the guide member. The compartments between the members 126, 128 can receive pressurized hydraulic fluid by way of an axial bore 140 and radial bores 141 machined into the spool 128. Such pressurized fluid will be permitted to flow into the chamber or chambers of selected aggregates in predetermined axial positions of the spool 128. The rear end portion of the spool 128 carries a ring-shaped fluid conveying element 142 which is rotatably mounted thereon and is connected with a flexible conduit 144 receiving pressurized fluid from a distributor 146 mounted on the rear end wall 106 of the spindle carrier 30. The fluid conveying element 142 has an internal annular groove which admits fluid to the axial bore 140 by way of several radial bores 140a in the rear end portion of the spool 128. The distributor 146 is coaxial with the main drive shaft 92 and preferably serves as a means for supplying pressurized fluid to the spools of all work spindles in the carrier 30. The conduit 144 is sufficiently long and sufficiently flexible to permit the spool 128 to move between a predetermined number of different axial positions in automatic response to indexing of the carrier 30. To this end, the element 142 carries a radially outwardly projecting follower 150 which extends into an endless cam groove 148a machined into the internal surface of a ring-shaped actuating cam 148 fixed to the frame 34 of the multiple spindle machine tool. The groove 148a is configured in such a way that the spools 128 of successive spindles 32 automatically assume the necessary axial positions for admission of pressurized fluid to the chamber or chambers of one or more selected aggregates when the respective spindles reach successive working stations. It is clear that, in addition to being movable axially by the actuating cam 148, the spools 128 can also be moved axially independently of the cam 148, for example, by means of suitable servo mechanisms which are not shown in FIG. 1. The cam 148 may consist of several discrete arcuate sections. Also, the groove 148a can be replaced by a shoulder or cam face against which the followers 150 of the spools 128 abut under the action of a pressurized fluid or under the bias of suitable springs, not shown.

The distributor 146 receives pressurized hydraulic fluid from a pump 1146 which draws fluid from a sump 2146 in the frame 34 for the spindle carrier 30. Spent fluid is returned to the sump 2146 through bores and channels 152 in the guide member 126 and spindle 32.

In the embodiment which is shown in FIG. 1, each sppool 128 is assumed to be movable axially between five different positions. In the first position of the illustrated spool 128, the brake 108 is engaged to hold the spindle 32 against rotation relative to the carrier 30, the clutches 70 and 94 are disengaged, and the work clamping device 42 is open. Thus, a finished article can be replaced with a fresh workpiece or blank while the workpieces in the clamping devices 42 of the other spindles 32 rotate and are being treated by one or more tools.

In the second axial position of the spool 128, the brake 08 remains engaged, the clutches 70, 94 remain disengaged and clamping device 42 is closed, i.e., it engages a freshly introduced workpiece or blank.

In the third position of the spool 128, the brake 108 is disengaged, the clutches 70, 94 remain disengaged, and the clamping device 42 remains closed. The spindle 32 can be rotated, either by hand or automatically by means other than the clutch 70 or 94, in order to move the spindle to a predetermined angular position relative to the carrier 30.

In the fourth position of the spool 128, the brake 108 and the clutch 94 remain disengaged, the clutch 70 is engaged and the device 42 remains closed. The spindle 32 rotates at the lower of two speeds.

In the fifth position of the spool 128, the brake 108 remains disengaged, the clamping device 42 remains closed, the clutch 70 is disengaged, and the clutch 94 is engaged. Therefore, the spindle 32 is driven at the higher of two speeds as long as the drive shaft 92 receives torque from the main prime mover of the machine tool.

It will be noted that the work clamping device 42 is open only in the first position of the spool 128, i.e., when the brake 108 holds the spindle 32 against rotation and the clutches 70, 94 are disengaged. Inversely, the brake 108 is disengaged only when the work clamping device 42 is closed. Also, the clutch 70 or 94 can be engaged only when the clamping device 42 is closed. The arrangement is preferably such that the spool 128 can reach its fifth position (clutch 94 engaged) only after it has moved through the fourth position (clutch 70 engaged) so that the acceleration of spindle 32 to the full or normal operating speed invariably takes place in two stages. Also, the movement of the spool 128 from fifth position to third, second or first position follows the movement to the fourth position so that the deceleration of the spindle 32 also takes place in two stages. If the ratio of the speeds of the spindle 32 in the fourth and fifth positions of the spool 128 is 1:2, the amount of heat energy which develops due to friction during braking of the spindle 32 is reduced in half and such heat energy is divided uniformly between the clutches 70 and 94. This greatly reduces the wear upon component parts of the clutches.

FIG. 1 further shows a screw 154 which meshes with the rear end portion of the guide member 126 and extends into an axially parallel peripheral groove 156 of the spool 128. This screw normally holds the spool 128 against rotation relative to the spindle 32 and guide member 126. The spool 128 is further provided with a second axially parallel peripheral groove 158 which is angularly offset relative to the groove 156 by 90° and can receive the tip of the screw 154 after the spool 128 has been rotated through one-fourth of a revolution. The construction of the spool 128 is such that, after it has been turned through 90°, it causes the jaws 44 to move radially outwardly in the second position and radially inwardly in the first position of the spool. This renders it possible to use the clamping device 42 for the gripping of workpieces from without (i.e., in response to inward movement of the jaws 44) or from within (in response to outward movement of the jaws 44).

Figure 3:
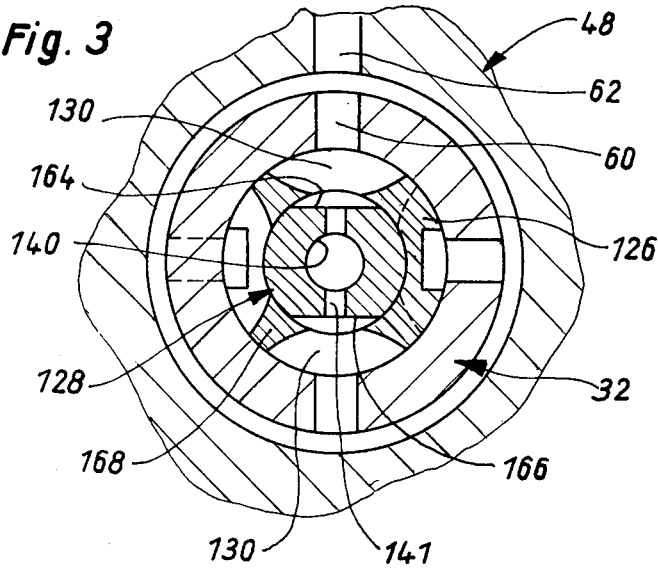
FIG. 3 is a transverse vertical sectional view as seen in the direction of arrows from the line 3—3 of FIG. 2.

FIGS. 2 to 5 illustrate the two angular positions of the spool 128 with respect to the guide member 126 and work spindle 32. Referring to FIG. 5 which shows the spool 128 in that angular position in which the tip of the screw 154 extends into the groove 158 (in FIG. 3, the spool 128 is shown in the same angular position as in FIG. 1), pressurized control fluid can flow through radial openings or channels 160, 161 and grooves 165, 167 of the guide member 128 as well as through radial openings or channels 162, 163 of the spindle 32 to enter the cylinder chamber 68 of the cylinder body 48a. This causes the piston 50 to move forwardly and the rod 52 causes the jaws 44 to move radially outwardly in the second axial position of the spool 128 to thereby engage a workpiece from within. FIGS. 3 and 5 further show that, instead of having annular compartments between a pair of lands 136, the portion of the spool 128 in the region of the cylinder body 48a is provided with two flats 164, 166 which are located diametrically opposite each other. This portion of the spool 128 cooperates with internal ribs 168 of the guide member 126 to define therewith channels for admission of pressurized control fluid into the chamber 64 or 68, depending on the angular position of the spool 128 relative to the guide member 126.

If it is desired to vary the pressure of fluid which is being admitted into the chambers of the aggregates 42, 70, 94, 108 in different angular positions of the spindle carrier 30, for example, to change the pressure of fluid in the chambers of the cylinder body 48a, the pintle 146a of the distributor 146 may be mounted for angular movement between two different positions in one of which the conduit 144 receives hydraulic fluid at a lower pressure and in the other of which the conduit 144 receives highly pressurized fluid.

Referring again to FIG. 1, it will be seen that at least some (i.e., three of four) aggregates on the spindle 32 can be installed between the bearings 38, 40 of the spindle carrier 30. Thus, these aggregates can be installed in a space which is not utilized at all in presently known multiple spindle machine tools. As mentioned before, the aggregates in presently known machine tools receive fluid which flows radially toward the respective spindles and, therefore, such aggregates must be mounted forwardly or rearwardly of the spindle carrier. It is clear that the brake 108, too, can be mounted in the space between the bearings 38, 40. Since the placing of a majority of the aggregates (or all of the aggregates) between the bearings 38, 40 results in a substantial reduction of the overall length of the spindle, it suffices to mount this spindle in two discrete antifriction bearings or in two sets of antifriction bearings which allows for a substantial reduction of the length of the spindle carrier. In presently known spindle carriers whose spindles carry several aggregates which are mounted forwardly or rearwardly of the spindle carrier, the overall length of the spindles is much greater and, therefore, such spindles must be mounted in at least three sets of spaced-apart antifriction bearings.

An important advantage of the improved control system is that a single valve member (spool 128) suffices to regulate the flow of control fluid to and from all of the fluid-operated aggregates on a rotary member (spindle 32) and also that the admission of pressurized fluid can take place axially rather than radially of the rotary member. Moreover, the valve member can be installed in the interior of the rotary member so that, if the guide member is considered a part of the rotary member, there is no need to provide any additional parts for reception of the valve member. It can be said that the valve member, the rotary member and the guide member together constitute a plurality of cooperating regulating valves for the flow of fluid to and from each of the fluid-operated aggregates on the rotary member. An advantage of the guide member is that it reduces the manufacturing cost of the rotary member because it cooperates with the valve member to properly seal the chambers of the aggregates in certain axial positions of the valve member and cooperates with the valve member to regulate the flow of control fluid to and from such chambers in other axial positions of the valve member. In the absence of the guide member, all channels, openings, grooves and/or passages which are provided therein would have to be machined directly into the rotary member.

Figure 6:
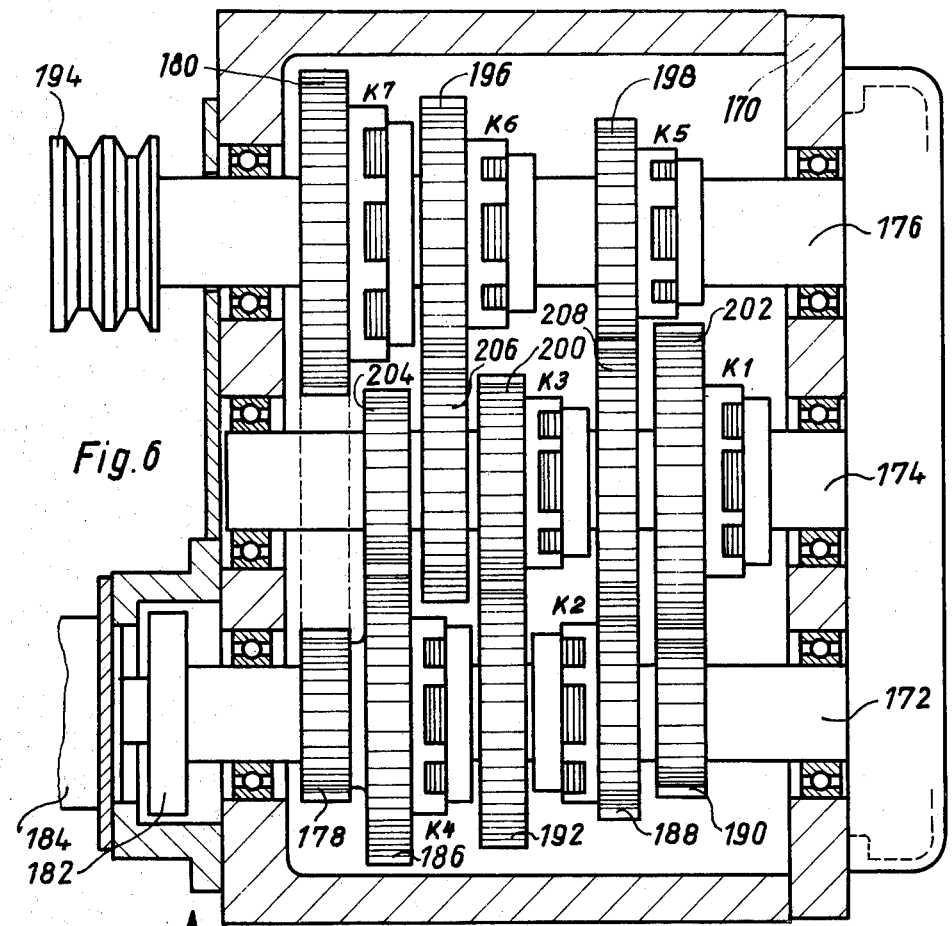
FIG. 6 is a somewhat schematic partly elevational and partly longitudinal sectional view of a multi-speed transmission wherein each shaft carries several fluid-operated aggregates receiving fluid through the intermediary of a control system which embodies another form of the invention.

FIG. 6 illustrates a transmission which can accelerate the driven parts to a full forward or reverse speed or decelerate the driven parts from full forward or reverse speed to zero speed in a large number of stages. Due to such stepwise acceleration or deceleration, each of the seventh fluid-operated clutches K1, K2, K3, K4, K5, K6, K7 of the transmission is subjected to a small fraction of the overall friction which normally develops in the course of acceleration or deceleration of driven parts in conventional transmissions. The amount of heat energy which develops during multi-stage acceleration is distributed among all of the clutches so that the output of the prime mover which drives the input element of the transmission is used for acceleration with an extremely high degree of efficiency which is close to 100 percent. Therefore, the wear upon the parts of the clutches is minimal.

The illustrated transmission comprises three rotary members in the form of shafts 172, 174, 176 in a triangular arrangement (see FIG. 14) which are mounted in a housing or case 170 and each of which carries a number of gears. Of these, the gear 178 is rotatable on the shaft 172 and the gear 180 is rotatable on the shaft 176. The gears 178, 180 are in mesh with each other. The shaft 172 is the input shaft and receives torque from a prime mover 184 (e.g., an electric motor) by way of a clutch 182. In addition to the gear 178, the input shaft 172 further carries gears 186, 188 which are rotatable thereon and gears 190, 192 which cannot rotate relative to the input shaft. The output shaft 176 is connected with a pulley 194 which rotates one or more driven parts by way of one or more V-belts, not shown. The output shaft 176 further carries two gears 196, 198 which are rotatably mounted thereon. The intermediate shaft 174 of the transmission carries two gears 200, 202 which are rotatably mounted thereon and respectively mesh with the gears 192, 190 of the input shaft 172. Still further, the intermediate shaft 174 carries three gears 204, 206, 208 which cannot rotate relative to the shaft 174 and of which the gears 204, 206 respectively mesh with the gears 186 (shaft 172) and 196 (shaft 176). The gear 208 meshes with the gears 108, 189 on the shafts 172, 176, respectively.

The clutches K1-K7 are respectively engageable in pairs to couple the gears 178, 180, 186, 188, 196, 198, 200, 202 to the respective shafts and to thus achieve a stepwise acceleration of the output shaft 176 to a full speed while the input shaft 172 receives torque from the motor 184 through the intermediary of the clutch 182. The table of FIG. 13 illustrates various combinations of clutches which are to be engaged in order to drive the output shaft 176 forwardly or rearwardly at a plurality of speeds (including eight forward speeds and four reverse speeds) as well as to hold the output shaft 176 against rotation.

Each of the clutches K1-K7 constitutes a fluid-operated aggregate, and FIG. 6 shows that each of the rotary members or shafts 172, 174, 176 carries at least two such aggregates. Each of the clutches is assumed to comprise a single-acting cylinder and a spring which biases the piston in the respective cylinder body in one direction. The valves which control the flow of pressurized fluid (e.g., oil) to and the flow of fluid from the cylinder chambers of the clutches K2, K4 and K1, K3 and K5, K6, K7 are respectively mounted in the shafts 172, 174, 176 in a manner as illustrated in FIGS. 8 to 10. The valves in the shafts 172, 174, 176 respectively comprise axially movble valve members or spools 210a, 210b, 210c which are surrounded by sleevelike tubular guide members 212a, 212b, 212c. The guide members 212a-212c are non-rotatably mounted in the respective shafts 172, 174, 176. It is assumed that the spools 210a-210c cannot rotate in the respective guide members 212a-212c. The manner in which the spools 210a-210c receive pressurized fluid is preferably the same as described for the valve member 128 of FIG. 1 (i.e., through axial bores 218a, 218b, 218c of the respective spools) and the fluid flows into the chambers of selected clutches K1-K7 by way of radial openings or channels machined into the spools 210a-210c, guide members 212a-212c and shafts 172, 174, 176. The just mentioned openings or channels are shown but not identified in FIGS. 8 to 10; the arrows indicate the flow of pressurized fluid to the chambers of the clutches K-K7 and these Figures further show the outlets for discharge of spent fluid from the chambers. The axial bores 218a, 218b, 218c of the spools 210a-210c receive pressurized fluid by way of flexible conduits 214 which discharge such fluid into ring-shaped fluid-conveying elements 216 mounted on but not rotating with the respective shafts 172, 174, 176 (see FIGS. 8 and 11 for the conduit 214 which admits pressurized fluid to the axial bore 218c of the output shaft 176). The reference characters 1214 denote an oil sump of the transmission which receives spent fluid from the chambers of the clutches K1-K7 and from which fluid is being withdrawn for introduction into the axial bores 218a-218c of the spools 210a-210c.

Figure 7:
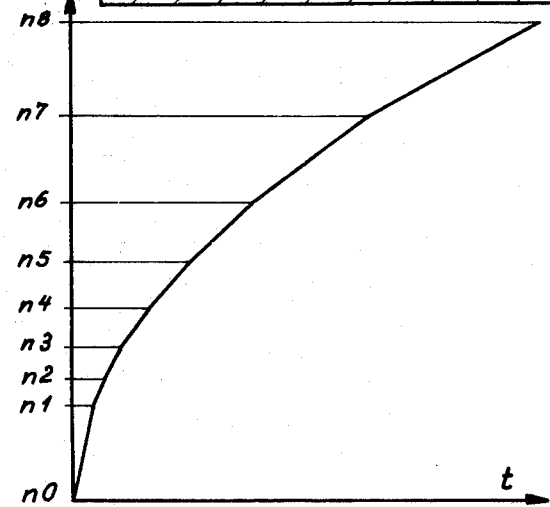
FIG. 7 is a diagram showing the length of intervals which elapse between successive stages of acceleration of the output shaft of the transmission from zero speed to a maximum forward speed.

The actuating means for moving the spools 210a-210c axially comprises a single rotary cam 220 (see FIGS. 14 and 15) which is indexible to a plurality of predetermined angular positions and is provided with discrete peripheral cam grooves for followers 222a, 222b, 222c which transmit motion to the respective spools in response to indexing of the cam. The followers 222a-222c respectively extend into suitable sockets of the fluid conveying elements 216 which are rotatable on but cannot move axially relative to the associated spools 210a-210c. These followers are respectively mounted on supporting levers 224a, 224b, 224c which are pivotably secured to the case 170 of the transmission. FIG. 12 illustrates in a developed view the three cam grooves 220a, 220b, 220c of the cam 220; these cam grooves respectively control the axial movements of spools 210a, 210b, 210c. If desired, all three followers 221a-222c can extend into a single groove of the cam 220 provided that two of the levers 224a, 224b, 224c remove the respective followers from the single groove when the remaining follower extends into the cam groove: in such embodiment of the actuating means for the spools 210a, 210b, 210c, the three sections of the single cam groove for the respective followers 222a, 222b, 222c are preferably of identical length, i.e., each thereof can extend along an arc of approximately 120 degrees. In response to a full revolution of the cam 220, the spools 210a-210c are moved to several axial positions so that the output shaft 176 can be decelerated from the maximum forward speed n8 (RPM - 2000, see FIG. 13), through zero forward speed $n_o$(braking of the shaft 176), to maximum reverse speed $n_{-4}$(RPM = 400, see FIG. 13) or vice versa. Thus, the acceleration or deceleration of the output shaft 176 in forward or reverse invariably takes place in stepwise fashion whereby the cam 220 preferably rotates at a predetermined constant speed. Those portions of the cam groove or grooves in the periphery of the cam 220 which cause the spools 210a-210c to assume predetermined axial positions are angularly spaced apart in such a way that the output shaft 176 rotates at the corresponding speeds for predetermined optimum intervals of time. The relative lengths of such intervals are shown in FIGS. 7 and 12. In preparing the diagram of FIG. 12, it was assumed that the output of the motor 184 during acceleration of the output shaft 176 remains constant.

Figure 15:
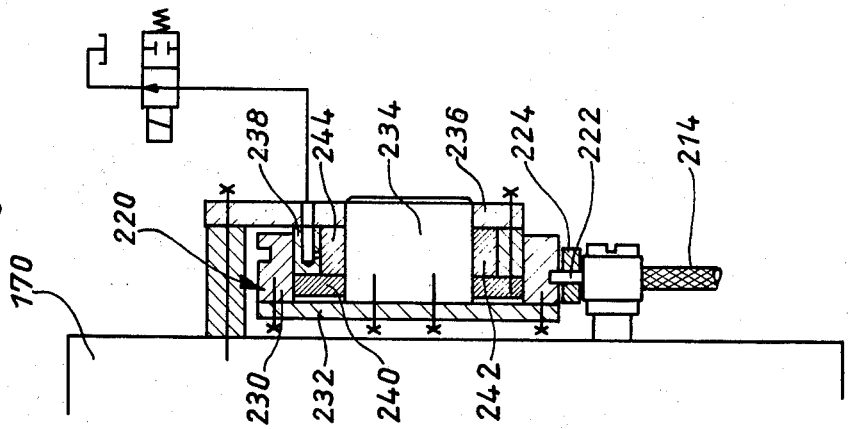
FIG. 15 is a sectional view as seen in the direction of arrows from the line 15—15 of FIG. 14.
Figure 14:
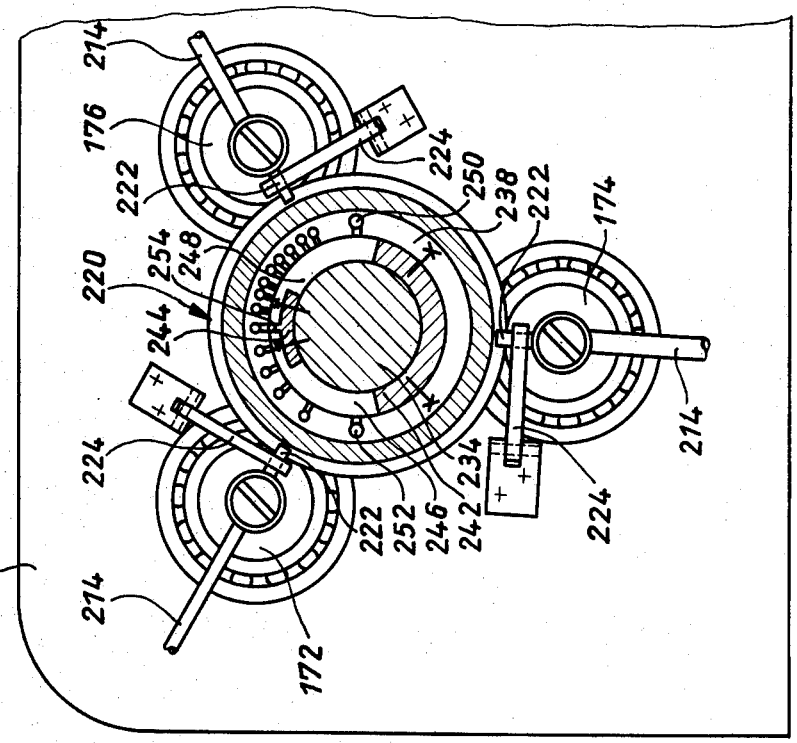
FIG. 14 is a transverse vertical sectional view of the means for indexing the actuating cam whose periphery is shown in FIG. 12.
Figure 16:
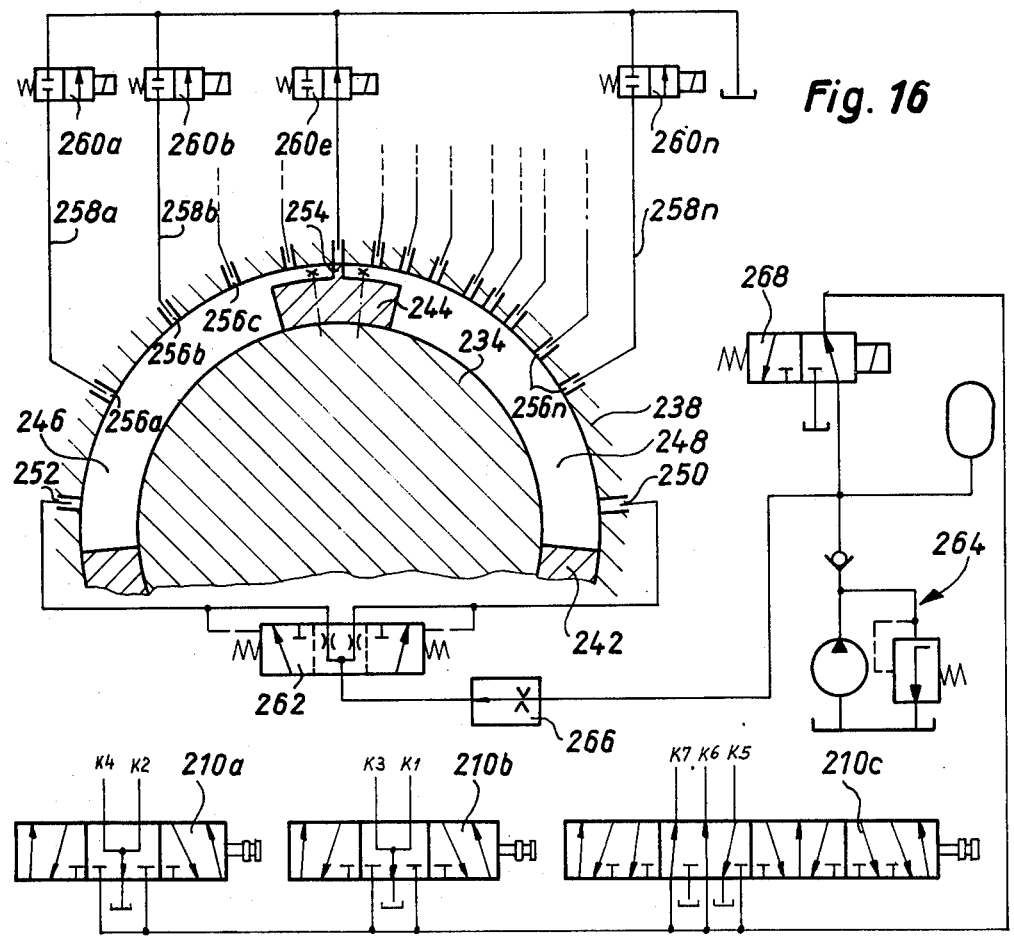
FIG. 16 is a diagram of the hydraulic circuit of the transmission shown in FIG. 6.

The means for indexing the actuating cam 220 for the spools 210a-210c is illustrated in FIGS. 14 and 15. The indexing means comprises a rotary piston which is received in rotates with a cylindrical body 230 of the cam 220. The body 230 is secured to a supporting plate 232 which is rigid with a cylindrical post 234 of the rotary piston. The post 234 is rotatable in a bearing plate 236 which is secured to the case 170 of the transmission. The bearing plate 236 further supports a centering ring 238 which extends into the body 230 and surrounds the post 234. That end of the ring 238 which extends into the body 230 is connected with a sealing annulus 240. Still further, the bearing plate 236 carries an arcuate member 242 which extends into the annular space between the post 234 and ring 238 and is located diametrically opposite a vane 244 secured to the post 234. The parts 242, 244 divide the annular space between the post 234 and ring 238 into two cylinder chambers 246, 248. The fluid which is admitted into the chamber 246 or 248 (while the fluid can flow from the chamber 248 or 246) causes the vane 244 to rotate the post 234 clockwise or counterclockwise, as viewed in FIG. 14. The chambers 246, 248 can receive pressurized fluid by way of conduits 252, 250 shown in FIGS. 14 and 16. As best shown in FIG. 16, the radially outermost portion of the vane 244 constitutes a narrow rib or web 254 having a width (as considered in the circumferential direction of the post 234) which equals or slightly exceeds the diameter of the inlet of each of a large number of fluid evacuating channels or passages 256a-256n which communicate with the chamber 246 or 248, depending on the angular position of the post 234. The inlets of the passages 256a-256n are machined into the internal surface of the ring 238 along which the web 254 sweeps when the post 234 rotates. When the web 254 registers with and seals a given inlet in the internal surface of the ring 238, the valve members 210a-210c in the shafts 172, 174, 176 assume predetermined axial positions corresponding to a given speed of the output shaft 176. The cam 220 rotates with the post 234 and vane 244. The passages 256a-256n are respectively connected with conduits 258a-258n (FIG. 16) which respectively contain shutoff valves 260a-260n. Each of these valves is shown in the form of a solenoid-operated valve.

The operation of the means for indexing the actuating cam 220 is as follows:

The opening of each of the shutoff valves 260a -260n entails the movement of spools 210a-210c to predetermined axial positions in which the output shaft 176 rotates at one of the speeds indicated in FIG. 13. For example, if the post 234 is to be rotated from the position shown in FIGS. 14 to 16 to an end position, in which latter position the web 254 seals the inlet of the passage 256n, the shutoff valve 260n is opened by remote control (for example, in accordance with a preselected program) while the valves 260a-260n-1 remain closed. The pressure of fluid in the chamber 248 decreases in response to opening of the valve 260n, and a hydraulic switchover valve 262 of known design (FIG. 16) automatically assumes a position (by moving its valve member in a direction to the right) in which a pump assembly 264 is free to supply pressurized fluid into the chamber 246 at a constant flow rate by way of a fluid flow regulating valve 266. The stream of fluid passing through the valve 266 flows through the valve 262 and conduit 252 to enter the chamber 246 whereby the vane 244 rotates the post 234 and the actuating cam 220 in a clockwise direction. The clockwise movement of the cam 220 is terminated when the web 254 registers with and seals the inlet of the passage 256n, i.e., when the cam 220 reaches its right-hand end position. While the post 234 rotates clockwise, as viewed in FIG. 16, the open shutoff valve 260n allows fluid to flow from the chamber 248 and to the sump 1214. The movement of the cam 220 to any selected angular position is reproducible with a high degree of accuracy because the fluid pressure in the chamber 248 or 246 rises immediately as soon as the web 254 registers with and seals the inlet of a selected passage 256. When the post 234 comes to a halt, the switchover valve 262 automatically resets itself to a neutral position in which the conduits 250, 252 are sealed from the pump assembly 264.

The pump assembly 264 of FIG. 16 may serve to supply pressurized fluid to the axial bores 218a–218c of the spools 210a–210c. FIG. 16 further shows a solenoid-operated valve 268 which can interrupt the flow of pressurized fluid to the bores 218a–218c so that the output shaft 176 then rotates due to inertia (idling).

The groove or grooves (220a–220c) of the actuating cam 220 can be replaced by shoulders or cam faces against which the followers 222a–222c of the spools 210a–210c are biased by pressurized fluid or by mechanical biasing means.

Figure 17:
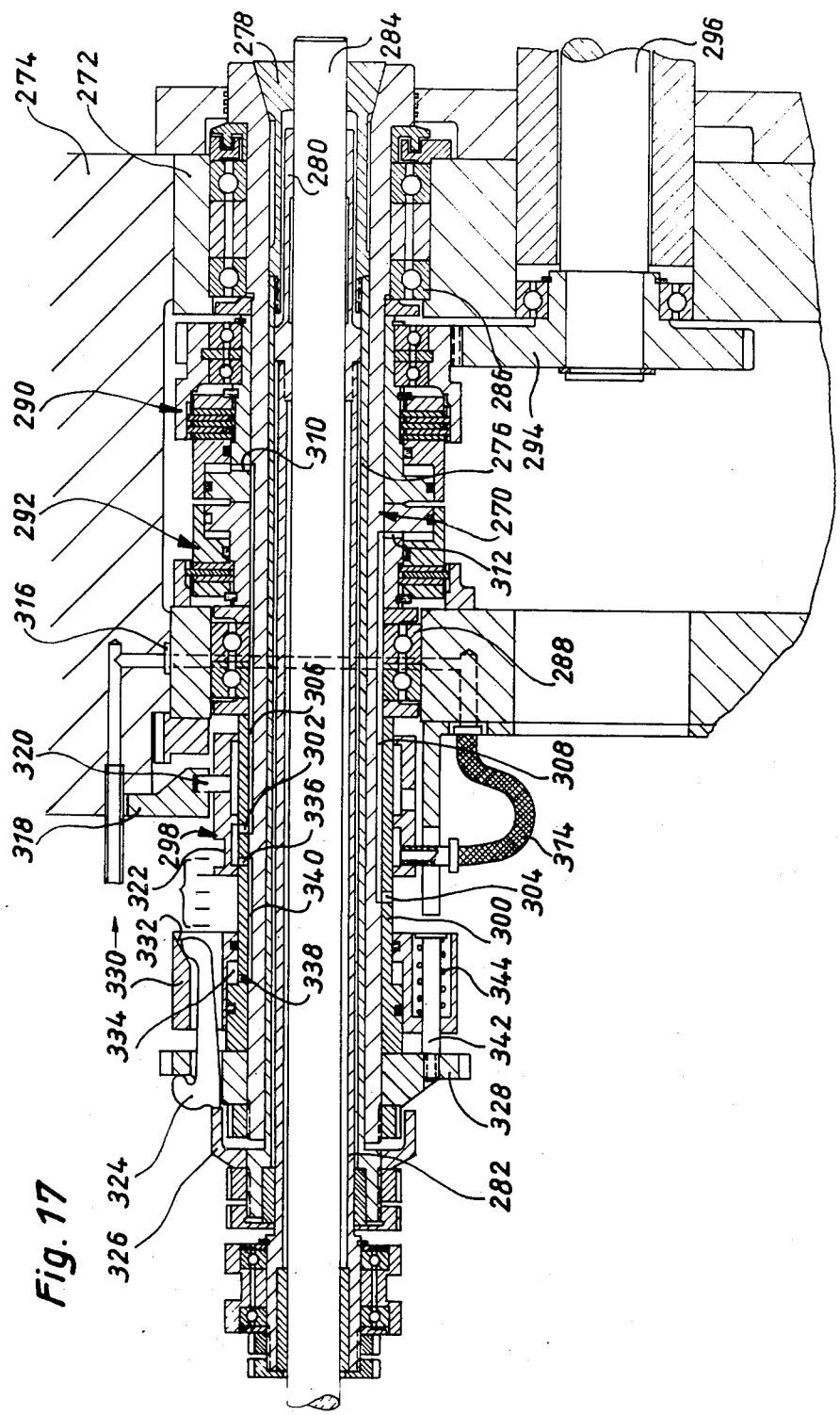
FIG. 17 is a fragmentary axial sectional view of a spindle carrier in a multiple-spindle bar machine wherein the fluid-operated aggregates on the work spindle receive fluid through the intermediary of a control system which embodies a third form of the invention.

FIG. 17 illustrates a portion of a modified multiple spindle automatic machine tool of the type known as a bar machine. Each work spindle 270 (only one shown in FIG. 17) constitutes a hollow rotary member which supports a number of fluid-operated aggregates and carries a hollow valve member 298. In contrast to the embodiments of FIGS. 1 and 6, the valve member 298 surrounds the work spindle 270 which is rotatable in antifriction bearings 286, 288 provided therefor in an indexible drum-shaped spindle carrier 272. The latter is rotatably mounted in the frame 274 of the multiple-spindle machine tool. The front end portion of the spindle 270 receives a work clamping device 278 which can be moved axially by a tubular motion transmitting or displacing member 276 and can clamp the adjacent portion of the bar 284 so that the front end portion of the bar (i.e., the right-hand end portion, as viewed in FIG. 17) can be converted into a shaped article by one or more tools at each of a series of working stations where the spindle 270 dwells before the finished article is removed from the machine. The reference character 280 denotes a tongs which serves as a means for advancing the bar 284 forwardly through increments of predetermined length. A portion of the tongs 280 extends into the work clamping device 278. The latter is of known design; it is provided with a conical external surface which can slide along a conical internal surface of the spindle 270 whereby the clamping device 278 engages and holds the bar 284 against axial movement. The actuating means for the tongs 280 comprises a tubular element 282.

The bearings 286, 288 for the work spindle 270 are rather closely adjacent to each other and flank a first fluid-operated aggregate 290 which constitutes a clutch and a second fluid-operated aggregate 292 which constitutes a brake. The construction of the clutch 290 and brake 292 is similar to or identical with that of the aggrregates 70 and 108 shown in FIG. 1. One half of the clutch 290 has a gear 291 in mesh with a driver gear 294 receiving torque from a main drive shaft 296 which is coaxial with and is rotatably mounted in the spindle carrier 272.

The valve member 298 is movable axially on the work spindle 270 behind the bearings 288 but cannot rotate on the work spindle. A sleeve-like tubular guide member 300 is interposed between the spindle 270 and valve member 298; this guide member is mounted directly on and rotates with the work spindle. The rear portions of all work spindles (i.e., those portions which extend rearwardly beyond the respective bearings 288 and support the corresponding guide members 300) are preferably confined in the spindle carrier 272 which defines an oil sump receiving spent fluid from the chambers of the fluid-operated aggregates on the work spindles. In other words, save for its foremost end portion, each of the work spindles 270 is fully received in the carrier 272.

The guide member 300 can supply pressurized fluid to the clutch 290 and brake 292 by way of openings or channels in the form of radial bores 302, 304. These bores respectively communicate with axially parallel grooves or channels 306, 308 machined into the peripheral surface of the work spindle 270. The grooved portions of the spindle 270 define with the adjoining parts (such as guide member 300, bearing 288, parts of the brake 292 and parts of the clutch 290) passages wherein the fluid can flow to a radial bore 310 of the clutch 290 and a radial bore 312 of the brake 292.

A flexible conduit 314 is connected to and delivers pressurized fluid to the valve member 298. The intake end of this conduit is connected to the carrier 272 and receives pressurized fluid by way of a bore 315 in the carrier 272. The bore 315 receives fluid from an endless groove 316 which is machined into the internal surface of the frame 274. The groove 316 receives pressurized fluid from a pump (now shown) by way of a supply conduit 317.

The actuating means for moving the valve member 298 axially comprises a stationary ring-shaped cam 318 which is secured to the frame 274 behind the bearings 288 and is tracked in a pin-shaped follower 320 of the valve member 298. When the follower 320 is disengaged from the cam 318 and/or valve member 298, the latter can be moved axially by a discrete servo unit (not shown) having an output element which can extend into a circumferential groove 322 of the valve member 298.

When the carrier 272 is indexed to advance the illustrated work spindle 298 from a preceding working station to the next-following working station of the machine tool, the follower 320 automatically shifts the valve member 298 lengthwise of the spindle 270 and guide member 300 so that the valve member 298 actuates or deactivates selected fluid-operated aggregates on or in the spindle 270. The follower 320 thereupon cooperates with the cam 318 to hold the valve member 298 against axial movement while the carrier 272 is at a standstill in the selected angular position relative to the frame 274.

The tubular motion transmitting member 276 which can actuate the clamping device 278 is movable axially of the work spindle 270 by conventional levers 324 which can shift a ring-shaped displacing member 326 rigidly mounted on the tubular member 276. The levers 234 are loosely inserted into axially parallel slots of a gear 328 which can be used as a means to rotate the spindle 270 to a desired angular position when the brake 292 and the clutch 290 are disengaged. The longer arms of the levers 324 extend into a sleeve 330 having a conical internal surface 332 serving as an abutment for the outwardly extending projections on the longer arms of the levers 324. In accordance with a feature of the invention, the axial bore of the sleeve 330 includes portions having different diameters so that the sleeve 330 defines with the adjacent portion of the guide member 300 an annular cylinder chamber 334 which can receive pressurized fluid in predetermined axial positions of the valve member 298 whereby the sleeve 330 moves in a direction to the right, as viewed in FIG. 17, and pivots the levers 324 with the result that the tubular member 276 causes the clamping device 278 to grip the bar 284. It will be seen that a portion of the sleeve 330 constitutes a displacing piston which is movable axially of the guide member 300 to thereby cause the clamping device 278 to move its jaws into or from engagement with the bar 284.

The cylinder chamber 334 can receive pressurized fluid by way of radial openings or channels 336, 338 which are machined into the guide member 300 and are connected to each other by an axially parallel groove 340 of the work spindle 270. When the admission of pressurized fluid into the chamber 334 is interrupted, the sleeve 330 automatically moves in a direction to the left, as viewed in FIG. 17, under the action of biasing means 344 so that the jaws of the clamping device 278 are disengaged from the bar 284. Each biasing means 344 comprises a helical spring which is guided by a stud 342 threadedly connected to the gear 328. The right-hand end convolutions of the springs 344 react against disk-shaped retainers on the right-hand end portions of the respective studs 342, and the left-hand end convolutions of the springs 344 bear against the sleeve 330. The radial channels 302, 306 of the guide member 300 are relatively close to each other so that they can receive pressurized fluid at the same time when the valve member 298 assumes a predetermined axial position (see FIG. 17).

FIGS. 18 to 22 illustrate five different axial positions of the valve member 298 relative to the respective guide member 300 and work spindle 270. The valve member 298 automatically moves from a preceding axial position to the next axial position in response to indexing of the spindle carrier 272 in the frame 274. As explained above, the actuating means for the valve members 298 on the work spindles 270 in the carrier 272 is the cam 318 which is fixedly mounted in the frame 274 adjacent to the path of movement of successive followers 320. It will be seen that the axial movements of valve members 298 take place in automatic response to rotation of the carrier 272. The operations which can be performed at various working stations of the machine tool include braking of the spindles 270, rotation of the spindles at given speeds, idling of the spindles, and actuation or deactivation of the clamping devices 278. The aforementioned servo unit enables the attendant to change the axial position of a selected valve member 298 while the spindle carrier 272 is at a standstill. The cam 318 automatically changes the axial positions of valve members 298 while the carrier 272 rotates relative to the frame 274. The brake 292 enables the spindle 270 to remain in a selected angular position relative to the carrier 272 while the latter is being indexed to move the spindle to the next working station. Such diversified operations can be performed in very few types of presently known multiple spindle automatic chucking or bar machines and then only by resorting to extremely complex, sensitive and expensive control systems.

In the first position of the valve member 298 (FIG. 22), the clutch 290 is engaged, the brake 292 is disengaged, and the clamping device 278 is open. The bar 284 can be fed forwardly by the tongs 280.

In the second position of the valve member 298 (FIG. 21), the clutch 290 is engaged, the brake 292 is disengaged and the clamping device 278 is closed. The spindle 270 is ready to begin to rotate in response to rotation of the main drive shaft 296.

In the third position of the valve member 298 (FIG. 20), the brake 292 is disengaged, the clutch 290 is also disengaged, and the clamping device 278 is closed. The spindle 270 can be rotated by hand or by a motor through the intermediary of the gear 328 so as to place it into a selected angular position with respect to the spindle carrier 272.

In the fourth position of the valve member 298 (FIG. 19), the clutch 290 is disengaged, the brake 292 is engaged and the clamping device 278 is closed. The foremost end of the bar 284 is ready to be treated by a boring or milling tool, for example, to drill a transverse bore or to cut a transverse notch therein.

In the fifth position of the valve member 298 (FIG. 18), the clutch 290 is disengaged, the brake 292 is engaged and the clamping device 278 is open. The spindle 270 is ready to receive a fresh bar 284 which can be removed from a magazine (not shown) and fed into the spindle through the rear end thereof.

An advantage of the hydraulically operated aggregate including the levers 324 and sleeve 330 is that the jaws of the clamping device 278 can grip the bar 284 with a predetermined force which does not change during treatment of the foremost end of the bar. Thus, all that is necessary is to maintain the fluid in the chamber 334 at a predetermined pressure whereby the conical surface 332 of the sleeve 330 maintains the levers 324 in angular positions which correspond to a preselected gripping action between the bar 284 and the jaws of the clamping device 278. Such arrangement renders it possible to dispense with conventional compensating elements, such as packages of dished springs or the like. Moreover, the levers 324 can be pivoted by a very short sleeve 330 and the levers 324 can be pivoted through relatively large angles which enables the jaws of the clamping device 278 to properly grip bars 284 whose diameters vary within a wide range as well as to properly grip bars (e.g., rolled stock) whose diameters deviate substantially from an optimum diameter.

The utilization of hollow valve members 298 renders it possible to install the improved control system in multiple-spindle machine tools wherein the space in the interior of each hollow work supporting spindle 270 must remain free for reception of bars 284 and work clamping devices 278 whose motion transmitting members 276 are received in the interior of the respective spindles. Such clamping devices are preferred in many types of multiple-spindle bar machines because they can properly grip bars of different diameters.

The improved control system exhibits a number of important advantages which are desirable not only in machine tools wherein one or more rotary members in the form of spindles must support several fluid-operated aggregates but also in transmissions or the like wherein several fluid-operated aggregates are mounted on shafts or analogous rotary members which rotate about fixed axes, i.e., wherein the shafts need not orbit about the axis of a carrier such as the carrier 30 of FIG. 1 or the carrier 272 of FIG. 17. It is well known that the drive means for one or more spindles in a modern machine tool, especially in a digitally controlled turning machine, must be capable of regulating the speed of the spindle or spindles with an extremely high degree of accuracy and that the spindle or spindles must be capable of transmitting a substantial torque with a high degree of efficiency. The same holds true for multispeed transmissions wherein the output member must be capable of rotating at a large number of different speeds with relatively small differences between successive speeds. Moreover, the transmission should be capable of accelerating a driven element to full speed or of decelerating a driven element to zero speed within extremely short intervals of time. This can be achieved by resorting to a large number of clutches. In such machines and apparatus, the energy which is lost as a result of conversion into heat must be furnished by the prime mover which is thus subjected to extremely high thermal stresses at the expense of reserve output which is needed for removal of material from the workpieces. The heat which is generated in the clutches is transmitted to the frame as well as to other parts of the machine and causes deformation which affects the accuracy of finish of the articles. In heretofore known machines and apparatus of the just outlined character, excessive heat generation and resulting deformation of the machine can be prevented or reduced only by resorting to extremely complex components in the form of costly d-c motors which must be combined with bulky and expensive transmissions in order to insure that the driven element or elements can receive satisfactory torque at a low RPM. The aforedescribed use of conventional fluid-operated aggregates also failed to reduce the generation of heat because conventional aggregates receive pressurized fluid which is conveyed radially inwardly rather than axially of the rotary members. It was further proposed to reduce the number of aggregates and to use lightweight transmissions which, however, cannot insure satisfactory acceleration of driven elements to a high speed, within a short interval of time, and in a large number of successive stages. Such multi-stage acceleration is desirable because it contributes to a reduction of friction in the clutches and hence prevents the generation of excessive heat which could distort the machine frame and could affect the quality of finish of the products. The same holds true for deceleration of driven elements from maximum speed to zero speed; during such deceleration, a prime mover which includes a multi-phase asynchronous motor can supply into the mains a substantial amount of energy which is proportional to the remaining kinetic energy of moving parts. It is further well known that the acceleration to a high speed in a large number of successive stages (with relatively small stepwise increase of the RPM) can be achieved within a shorter interval of time than an acceleration from zero speed directly to a high RPM. Multi-stage acceleration cannot be achieved satisfactorily with electrically operated clutches because the intervals which are required for each stage are much too long and are not reproducible with a desired degree of accuracy. This not only reduces the output of the machine tool but also interferes with the operation in accordance with a predetermined schedule.

The improved control system can be used to regulate the flow of fluid to and from any desired practical number of fluid-operated aggregates on shafts, spindles and/or other rotary members. This renders it possible to accelerate the output element of a multi-speed transmission in a very large number of stages, with an unmatched degree of reproducibility and with minimal generation of heat. The ultimate or intermediate speeds of the output member can be selected from without and can be changed as often as desired.

The advantages of multiple-spindle automatic machine tools which embody the improved control system can be summarized as follows: The speed of the work supporting spindles can be regulated in a simple and efficient way, and the spindles can carry a substantial number of fluid-operated aggregates which is sufficient to enhance the versatility of the machine tool, for example, by allowing the treatment of workpieces while the respective spindles are held against rotation in their carrier, by enabling the spindles to rotate at two or more speeds, by allowing an idling of the spindles so that the operator can move selected spindles to predetermined angular positions (either by hand or by resorting to automatic servo units). Moreover, the provision of means for moving the valve members independently of the actuating means therefor renders it possible to deviate from a preselected program, when necessary, so as to carry out special operations which must be performed irregularly and at infrequent intervals. On the other hand, the provision of common actuating means for all of the valve members in a machine tool insures that the valve members automatically assume predetermined positions at selected working stations, that the axial positions of valve members cannot change during treatment of workpieces at successive stations, as well as that the attendant need not be concerned with the shifting of valve members because each valve member is moved axially in automatic response to indexing of the spindle carrier. Still further, such automatic shifting of the valve members insures that each valve member already assumes an optimum position as soon as it completes the movement from a preceding working station to the next-following working station.

An additional advantage of the improved control system is that, when such a system is built into a machine tool with for example eight spindles, a group of four spindles can carry workpieces which are subjected to a first type of treatment and a group of four spindles can carry workpieces which are to be subjected to an entirely different second treatment. This will be readily appreciated since all that is needed is to configurate the actuating means for the valve members in such a way that each valve member assumes a predetermined position whenever it reaches a working station.

Still another advantage of the improved control system in a multiple-spindle machine tool is that the changes in setup can be completed with minimal losses in time. All that is normally needed is to change the tooling and to replace the actuating means with another actuating means which is capable of moving the valve members to predetermined axial positions for the treatment of a new series of workpieces.

In heretofore known multiple-spindle machine tools wherein each spindle supports three clutches (so that it can be rotated at two different speeds) and a brake, the actuation or deactivation of clutches and/or brakes at each of a number of working stations presents serious problems, not only due to unsatisfactory delivery of fluid in the radial direction of clutches but also because the control systems of such machine tools are extremely complex and prone to malfunction. Moreover, the changes in setup take up extremely long intervals of time which causes substantial losses in output due to long periods of idleness between the treatment of successive batches of different workpieces. All this can be avoided by resorting to the improved control system which can be used not only in machine tools or other apparatus wherein the interior of a rotary member cannot be occupied by the component parts of the control system but also in machine tools or other apparatus wherein the component parts of the control system can be installed directly in the interior of a rotary member whereby the admission of fluid can take place axially rather than radially of the rotary member.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a spindle arrangement for a machine tool, a combination comprising support means; at least one rotary work supporting spindle member mounted in said support means; a plurality of fluid-operated devices mounted on said rotary work supporting spindle member, said devices including at least one clutch device, at least one brake device, and at least one work clamping device; a source of pressurized fluid; and control means for connecting selected devices with said source and for permitting selected devices to discharge control fluid, said control means comprising a valve member, one of said members being hollow and surrounding the other of said members, said valve member being movable axially of said work supporting spindle member between a plurality of positions in each of which at least one of said devices is connected with the source while the other are free to discharge control fluid, and actuating means for moving said valve member between said positions.

2. A combination as defined in claim 1, further comprising at least one additional rotary work supporting spindle member mounted in said support means and additional fluid-operated devices mounted on said additional rotary work supporting spindle member, said control means comprising an additional valve member, one of said additional members surrounding the other additional member and said additional valve member being movable axially of said additional rotary work supporting spindle member between a plurality of positions in each of which at least one of said additional devices is connected with the source while the others are free to discharge control fluid, said actuating means comprising cam means arranged to move all of said valve members axially with respect to the corresponding rotary work supporting spindle members.

3. A combination as defined in claim 2, wherein said valve members comprise portions extending axially and beyond the respective rotary work supporting spindle members and said cam means includes a single cam arranged to move all of the valve members axially away of said portion thereof.

4. A combination as defined in claim 3, wherein said source comprises a distributor for control fluid and said valve members comprise fluid conveying elements communicating with said distributor and mounted on said portions of the respective valve members.

5. A combination as defined in claim 1, and including a tubular guide member interposed between said rotary work supporting spindle member and said valve member, said valve member extending with a portion thereof beyond said work supporting spindle member, said actuating means being operatively connected to said portion of said valve member.

6. A combination as defined in claim 1, wherein said rotary work supporting spindle member has an axial bore, said tubular guide member being received in said bore and surrounding said valve member.

7. A combination as defined in claim 1, wherein said tubular guide member surrounds said rotary work supporting spindle member, and said valve member surrounds said tubular guide member.

8. A combination as defined in claim 1, further comprising at least one additional rotary work spindle member mounted in said support means and additional fluid-operated devices mounted on said additional rotary work supporting spindle member, said support means constituting a rotary spindle carrier, said control means further comprising an additional valve member for said additional rotary work supporting spindle member and each of said valve members having follower means, said actuating means comprising stationary cam means adjacent to the path of movement of and being tracked by said follower means.

9. A combination as defined in claim 8, wherein said cam means comprises a plurality of discrete sections.

10. A combination as defined in claim 9, wherein said discrete sections form a common cam groove.

11. A combination as defined in claim 8, wherein each of said work supporting spindle members has an axial bore and wherein one of said devices of said first-mentioned work supporting spindle member and one of said additional devices constitutes a work clamping device having portions movable radially inwardly to thereby engage workpieces which extend into the respective work supporting spindle member, each of said work clamping devices further comprising means for moving said portions relative to the respective work supporting spindle member and said means for moving including a sleeve axially movably mounted on the respective spindle member.

12. A combination as defined in claim 11, wherein each of the work clamping devices further comprises a motion-transmitting member mounted in the respective spindle member and having a portion adjacent to said sleeve and lever means pivotably mounted between said sleeve and said portion of said motion-transmitting member to move the latter lengthwise in response to axial movement of said sleeve, whereby said portions of the work clamping device move relative to a workpiece in the respective spindle member.

13. A combination as defined in claim 12, wherein each of said sleeves constitutes the piston of a hydraulic cylinder which defines a chamber arranged to receive pressurized control fluid by way of the corresponding valve member to thereby effect a movement of said portion of the respective work clamping device into engagement with a workpiece in the corresponding spindle member.

14. A combination as defined in claim 13, further comprising means for permanently biasing said sleeve in a direction to disengage the respective clamping devices from the workpieces in said spindle members.

15. A combination as defined in claim 1, wherein said clamping device comprises a plurality of work engaging elements movable to and from work engaging positions, and a displacing member movable axially of said work supporting spindle member and arranged to thereby move said elements.

16. A combination as defined in claim 15, wherein said displacing member is a piston and said clamping device further comprises a double-acting cylinder member receiving said piston and defining therewith first and second fluid receiving chambers disposed at the opposite ends of said piston, said valve member being rotatable with respect to said work supporting spindle member between a first angular position in which it can admit pressurized control fluid to one of said chambers in at least one axial position thereof and a second angular position in which it can admit pressurized control fluid to the order of said chambers in at least one axial position thereof, whereby said elements respectively move to first and second work engaging positions in response to admission of fluid into said first and second chambers.

17. A combination as defined in claim 16, and further comprising means for releasably holding said valve member in a selected one of said angular positions.

* * * * *